United States Patent [19]

Bridwell

[11] 4,145,853

[45] Mar. 27, 1979

[54] CABLE TROUGH SYSTEM

[76] Inventor: James T. Bridwell, P.O. Box 61 Wildwood Br., Village Mills, Tex. 77663

[21] Appl. No.: 834,120

[22] Filed: Sep. 19, 1977

[51] Int. Cl.² .................. H02B 1/06; E04F 17/00
[52] U.S. Cl. ................. 52/221; 361/428; 174/48
[58] Field of Search ............ 52/221, 220; 174/48, 174/49, 96; 361/426, 427, 428, 429

[56] References Cited

U.S. PATENT DOCUMENTS

| | | | |
|---|---|---|---|
| 2,191,637 | 2/1940 | Wier | 361/429 |
| 2,567,740 | 9/1951 | Smith | 361/428 |
| 2,688,109 | 8/1954 | Holland | 361/428 |
| 3,116,360 | 12/1963 | Cole | 52/220 |
| 3,274,451 | 9/1966 | Laity | 361/429 |
| 4,032,821 | 6/1977 | Keiser | 174/48 |
| 4,038,796 | 8/1977 | Eckel | 52/221 |

*Primary Examiner*—John E. Murtagh
*Attorney, Agent, or Firm*—Darryl M. Springs

[57] ABSTRACT

An electrical equipment cable trough system for use with electrical equipment panel installations and providing internal retaining members defining a cable way having a cable-insertion space extended between the upper and lower extremities of each panel. Additionally, U-shaped header troughs are attached to the upper extremity of each panel with U-shaped cross-troughs extending between parallel groups of abutting panels. The interrelation between adjacent header troughs and cross-troughs permit a single panel to be removed from a group while continuing to provide support for the interconnected conductors carried by the trough system.

18 Claims, 9 Drawing Figures

CABLE TROUGH SYSTEM

BACKGROUND OF THE INVENTION (1) Field of the Invention

The present invention relates to electrical equipment wiring trough systems used with relay panel or rack installations and the like, and in particular relates to a wiring trough system permitting easy installation of intra-panel and inter-panel wiring conductors or cables used to interconnect electrical equipment mounted in the various relay panels of the installation, and readily permits removal or replacement of a single panel within the installation.

(2) Description of the Prior Art

Industries and utilities commonly require large installations of electrical and electronic monitoring and switching equipment to enable them to provide their particular services to their customers. Such installations commonly include floor mounted panels or racks, each containing various electrical equipment which is electrically interconnected by wiring conductors and cables to various other electrical equipment contained in the same or other panels to provide the desired services. Further, limitations imposed by the space available for an installation, and the desirability of reducing point-to-point conductor lengths, have led to a standard practice of installing the panels in juxtaposed groups called switchboards, with the switchboards being arranged in parallel, back-to-back groups.

In electric utilities in particular, multi-conductor cables connect equipment located in a substation yard with an equipment panel. Normally, the conductors within the cables are terminated on a terminal block located at the lower extremity of the panel. Due to the electrical power involved, large, single conductors and generally used in point-to-point connections both within an individual panel and via wiring troughs within parallel switchboards.

In the prior art, various methods have been used to provide wiring troughs to carry the interconnecting conductors and cables, both for one switchboard and between parallel switchboards. These wiring cable troughs are utilized to maintain the conductors or cables in an orderly, out-of-the-way fashion and to support the interconnecting conductors, which may be quite heavy.

Generally, the cable troughs disclosed in the prior art are so designed and interconnected as to require that the interconnecting conductors connected into the panel installation, be pulled through the cable troughs and past the panels within the installation. The conductors to be interconnected into a particular panel must be pulled out of the trough and then threaded through the panel structure to the various electrical equipment, or to terminal boards on the panel. Pulling the conductors into the cable troughs requires many installation man-hours, the number of which increase as the number of conductors being pulled into the trough increases. This increase is due to several factors. First, pulling a large number of conductors obviously requires more time than pulling a small number. Second, each additional conductor pulled into a trough reduces the cross-sectional area within which to pull additional conductors, thereby increasing the time required to pull in the succeeding conductors. Third, the conductors must be carefully pulled through the troughs to avoid damage to the conductors and insulation, and as the number of conductors in a trough increases, the care required increases and the time required to pull the conductors correspondingly increases.

Once the conductors are positioned and interconnected, the prior art troughs are fixed in position in permanent attachment to the rear of the panels or racks. Thus if a particular panel within a switchboard is to be removed, the intrapanel conductors must be disconnected and then the interconnecting conductors must be pulled out of the panel. Next, removal of the single panel may necessitate the removal of conductors from the trough which are not associated with the particular panel being removed. Additionally, as one cable trough will carry conductors which terminate in various panels, the conductors in panels not being removed may have to be disconnected and removed from the cable trough to allow panel removal.

Conventionally, parallel installations of equipment panels or switchboards are interconnected by cross-braces attached at the upper extremity of the panels. In the prior art, these braces have provided for carrying cables between the parallel switchboard groups. For the same reasons above-described, replacing a single panel in one of the parallel groups may necessitate pulling the cable from a cross-brace. Additionally, most prior art systems require that the cross-brace be completely detached at one end, from not only the panel being removed, but also from adjacent panels on the switchboard, in order to remove the single panel from the installation. Further, to prevent damage to the still connected end of the cross-brace, all cables should be removed from the cross-brace and the unconnected end supported until a new panel is in place.

To overcome the obvious disadvantages in the above-described prior art, there is depicted and described in U.S. Pat. No. 2,567,740, an embodiment of a cable trough system having a single, open, cable trough transversely interconnected to the channel cross-bracing at a central location between the two parallel groups. However, to effect removal of a single panel, the conductors interconnected to that panel and which are carried from the central trough internally in the cross-bracing may have to be pulled. Additionally, the cross-braces must be disconnected from the panel being pulled to allow its removal, thus allowing the weight of the cables carried within the trough to cause the trough to sag and thereby risking trough damage.

It is also a common practice in the prior art to provide at least one completely enclosed, vertically-oriented, internal recess or channel within each equipment panel to receive the incoming conductors associated with the equipment supported by the panel, with such channel having openings at preselected locations to permit pulling the conductors from within the channel to the particular location of a piece of equipment with which it is to be interconnected. In such prior art panels, during installation of the panel, the conductors associated with that panel must be pulled through the vertical recess or channel and out through the preselected openings as above-described. Again, removal of a single panel from an installation will require that the conductors be completely withdrawn from the vertical recess or channel.

The disadvantages of the prior art are overcome with the present invention, and an equipment panel switchboard construction and interconnecting wiring trough system is provided which allows removal of a single panel without completely disconnecting the cross-bracing interconnecting the parallel switchboards of the installation, and which provides adequate support for the wiring subsequent to panel removal and prior to the installation of a replacement panel. Further, the present invention permits the replacement panel to be completely wired internally prior to emplacement within the switchboard group.

SUMMARY OF THE INVENTION

According to the present invention, apparatus is provided for supporting wiring, conductors or cables interconnecting electrical equipment contained in groups of panels or racks (also called switchboards) and for positioning the conductors in predetermined wiring runs quickly and efficiently, effecting a significant reduction in labor required to install the switchboards and the associated interconnection wiring runs. Additionally, the apparatus maintains the conductors in an orderly, readily-accessible fashion which permits a single panel within a switchboard to be disconnected and replaced without requiring the removal of the emplaced conductors. Further, the apparatus permits internal prewiring of each panel so that a panel may be removed and replaced with a minimum of time required to interconnect the replacement panel into the existing equipment installation.

The apparatus utilizes a panel having a vertical front member for mounting electrical equipment, a pair of vertical end members fixed to the front face and extending normally thereto, and rear vertical panel members fixed to the end members and defining a rear rack surface spaced from and parallel to the front face of the rack. Although the above-described panel members may be separate elements interconnected in any conventional manner, current practice is to form the elements of the panel from a single sheet of steel or other suitable material.

In one aspect of the invention, a plurality of vertically-spaced horizontally extending rods are fixed to the rear surface of the front member and cooperate with the vertical panel end members to form a vertical guide channel for accommodating the intrapanel conductors. Each rod terminates short of the rear vertical panel members for defining a wiring access spaced into the vertical guide channel. Conductors used to provide internal panel wiring may readily be emplaced in the vertical guide channel by slipping the conductors through the multitude of vertically spaced access spaces defined by the rods and the rear panel members of the panel.

The apparatus further includes a wiring header trough interconnected to the rear of each panel which comprises an elongated section of U-shaped channel having a support bracket interconnected to either end for mounting to the rear of the panel. The support brackets include mounting flanges which are interconnected to the rear panel members adjacent the upper extremity of the panel. A terminal block is mounted on the outside surface of the wiring header trough and may extend the length of the trough. Thus, internal panel wiring between the electrical equipment supported by the panel and the terminal block may be accomplished prior to installation of the panel within a group. The header trough is open at the top for receiving panel interconnecting wiring, the conductors of which may be connected to appropriate pins of the terminal block. Once the conductors of the interconnecting wiring have been disconnected from the terminal block, the panel may be removed merely by lifting the interconnecting wiring out of the header trough.

The apparatus additionally includes cross-trough members each comprising an elongated U-shaped channel having an end wall at each extremity. The cross-troughs are transversely connected between the parallel switchboards to provide for routing and supporting of panel interconnecting wiring.

The ends of the header trough members interconnected to adjacent panels in a switchboard are spaced to receive the closed end of the cross-trough member. An aperture is provided in the side walls of the cross-trough member on each end that registers with the open spaced ends of adjacent header troughs.

Once the panels are positioned with the cross-trough members installed, wiring may be readily placed within the header and cross-troughs with those cables and/or conductors associated with a particular panel pulled out and interconnected to the terminal block of that panel. Intrapanel wiring to panel equipment then interconnects to the terminal block to complete the circuits. If it becomes necessary to remove a particular panel, the conductors between the wiring trough and the terminal block may be disconnected, one end of the cross-trough to the particular panel removed, and the wiring carried within the header trough of the panel to be removed lifted out of the way, allowing the panel to be tipped forward and removed without pulling any wiring from the panel. By merely reversing the above-described steps, a new panel may be positioned within the group, again without pulling any wiring into the panel itself.

Accordingly, one feature of the present invention is to provide means for internally wiring an electrical equipment panel or rack prior to installation within a group.

Another feature of the present invention is to provide means for removing a single panel within a group or switchboard without the necessity of pulling the interconnecting wiring conductors or cables or disturbing switchboard wiring routed from panel to panel via the header trough of the panel to be removed.

Yet another feature of the present invention is to provide trough means for supporting interconnecting wiring between side-by-side panels and parallel switchboards which may be disconnected to permit removal of a single panel while still maintaining support of the interconnecting cabling.

These and other important features and advantages of the present invention will become apparent from the following detailed description wherein reference is made to the figures in the accompanying drawings showing preferred embodiments of the present invention.

BRIEF DESCRIPTION OF THE DRAWINGS

In order that the manner in which the above-recited features and advantages can be understood in detail, a more particular description of the invention may be had by reference to the specific embodiments thereof which are illustrated in the appended drawings, which drawings form a part of this specification. It is to be noted, however, that the appended drawings are only typical embodiments of the invention and therefore are not to be limiting of its scope for the invention may admit to other equally effective embodiments.

In the drawings.

DETAILED DESCRIPTION OF THE PREFERRED EMBODIMENTS

Figure 1:
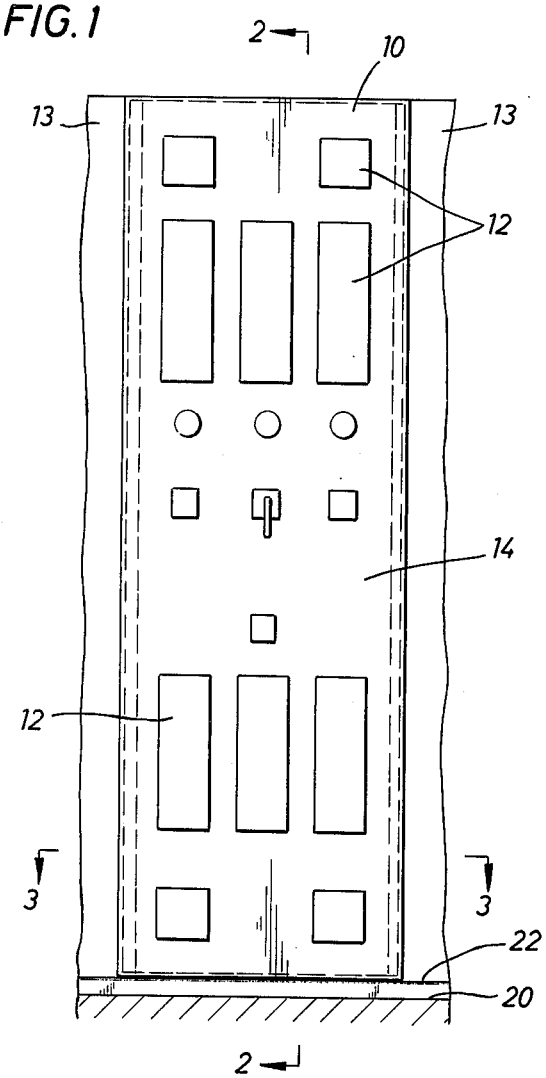
FIG. 1 is a front elevational view of an electrical equipment panel of the type incorporating the present invention.
Figure 2:
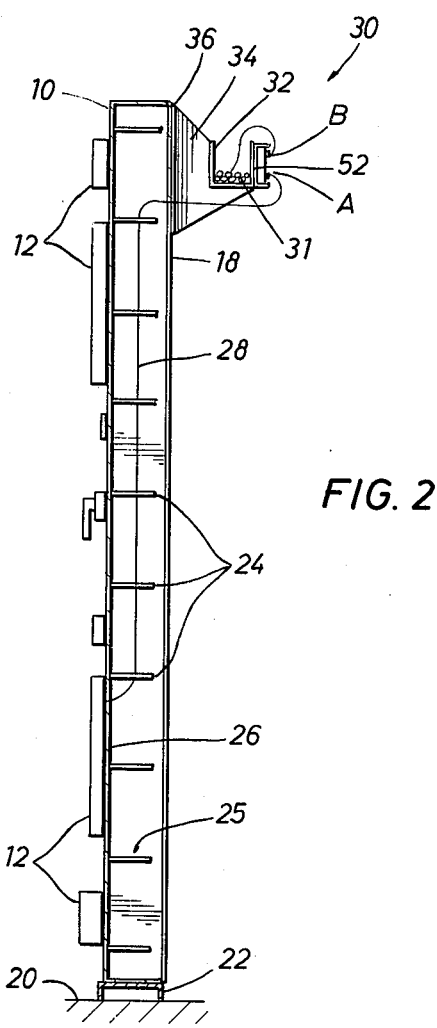
FIG. 2 is a vertical cross-sectional view of the panel shown in FIG. 1 taken along lines 2—2 and showing the rods forming the internal conductor channel and a typical header trough of the present invention.
Figure 3:
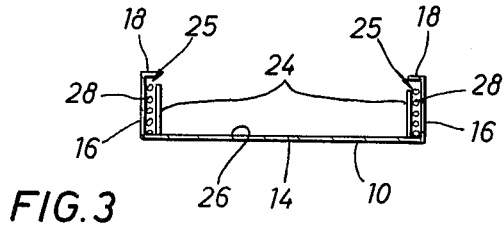
FIG. 3 is a horizontal cross-sectional view of the panel shown in FIG. 1 taken along lines 3—3, and showing conductors emplaced in the internal channels formed by the ends of the panel and the retaining rods of the present invention.

Referring now to FIGS. 1, 2 and 3, there is depicted an electrical panel 10 of the type used in large installations to support electrical equipment 12, such as electrical measuring equipment and switching relays. The panel 10 is typically formed from a single rectangular, steel sheet in a U-shaped configuration and is typically positioned in a vertical position as shown, adjacent to other panels 13. The U-shaped configuration provides an intermediate front panel or body member 14 having parallel end portions 16 terminating in an inwardly rolled portion 18 that is parallel and spaced from front panel member 14. Panel 10 is designed to rest on a horizontal planar surface, such as a floor 20, although in conventional use, a U-channel spacer 22 may be positioned between panel 10 and floor 20 to provide a mounting foot or base.

FIGS. 2 and 3 show vertical and horizontal cross-sectional views of panel 10 and clearly show the conductor retaining rod 24 placement which defines the internal vertical channel 25 of panel 10. A plurality of rods 24 are positioned in a vertically spaced relation adjacent each panel end portion 16 with one extremity of each rod 24 connected to the inner surface 26 of panel member 14. The rods extend normally outward from surface 26 and parallel to end portion 16 and have a preselected length which positions the free extremity of the rods 24 in a spaced relation to the rolled lip portions 18. Electrical cables or conductors 28, associated with the electrical equipment 12, may be easily positioned internally in the panel 10 by looping the conductors 28 through the opening between the free extremity of rod 24 and lip 18 and into the channel 25 formed between rod 24 and end portion 16. As shown diagrammatically in FIG. 2, the conductors 28 associated with a particular item of equipment 12 may be readily pulled out of the vertical channel 25 through the space formed between adjacent rods 25 which is closest to the particular item of electrical equipment 12 to which the conductor 28 is to be connected.

Although shown as a plurality of rods 24 in the preferred embodiment, it is understood that for other embodiments, alternative methods for retaining the conductors may be used. For example, an elongated rectangular sheet of rigid material (not shown) having a plurality of openings formed therein to provide a lattice-like or ladder-like structure may be utilized. Such a member may be connected along one longitudinal edge to surface 26 in the same orientation as rods 24 and terminates short of rear members 18 for providing cable access to the conductor vertical channels 25, and the openings in the member provide conductor access to electrical equipment mounted in the panel.

Figure 4:
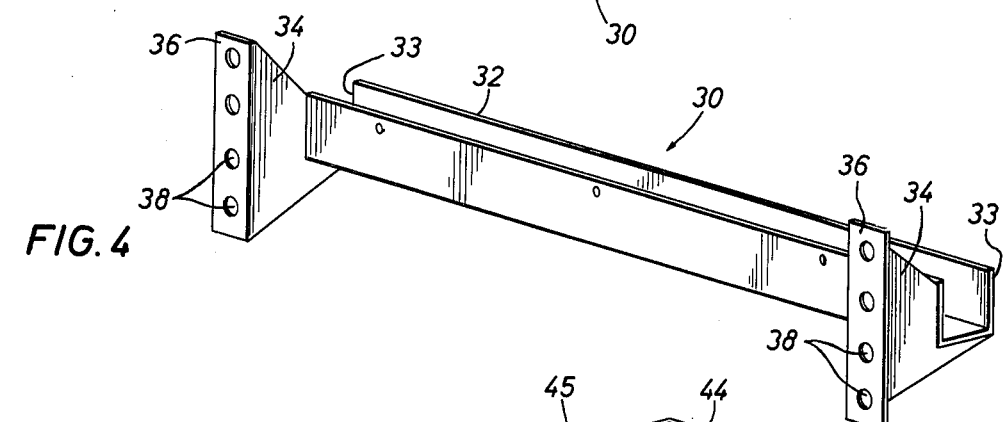
FIG. 4 is a detailed perspective view of the header trough of the present invention.

Referring now to FIGS. 2 and 4, there is shown the header trough 30 of the present invention. Header trough 30 comprises a U-shaped channel member 32 having a pair of transverse support brackets 34 attached at each end 33. Bracket 34 terminates in a rectangular mounting flange 36. The vertical face of mounting flange 36 when mounted to the rear of panel 10 positions and orients header trough 30 to carry and support conductors 28 in a horizontal position as shown in FIG. 2. Each flange 36 carries four spaced apertures along a vertical line through the mounting flange 36. The length of channel member 32 is selected to position apertures 38 in mounting flange 36 in registration with four similarly oriented and spaced bolt-holes (see FIG. 7) provided in each rolled lip 18 adjacent to the upper extremity of panel 10.

The header trough 30 is interconnected to equipment panel 10 by positioning the mounting flanges 36 to align apertures 38 with the bolt-holes defined in each panel lip 18 for positioning the header trough across the back of the panel. Conventional fastening means, such as the bolt and nut arrangement 35, 36, shown more clearly in FIG. 7, utilize the two center apertures 38 on each flange 36 to securely fasten the header trough 30 to the panel 10. Apertures 38 adjacent each extremity of flange 36 are not utilized to interconnect the header trough 30 to the panel 10 but rather for purposes which will hereinafter be further explained.

Figure 5:
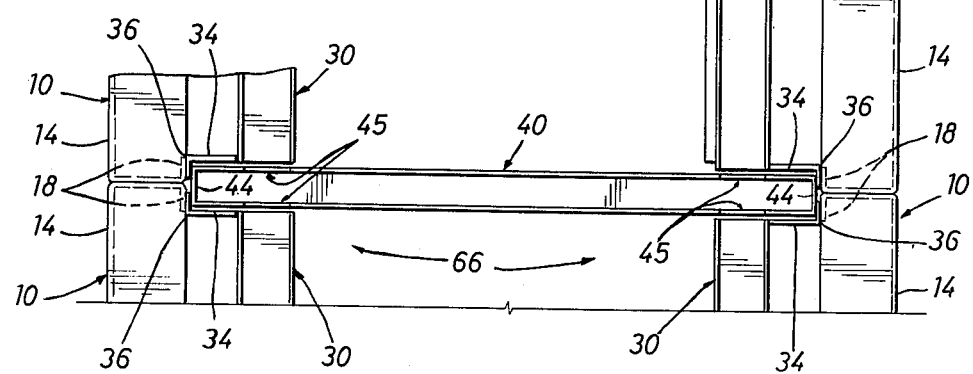
FIG. 5 is a partial plan view of the header trough and cross-trough of the present invention shown interconnected to parallel switchboards.
Figure 7:
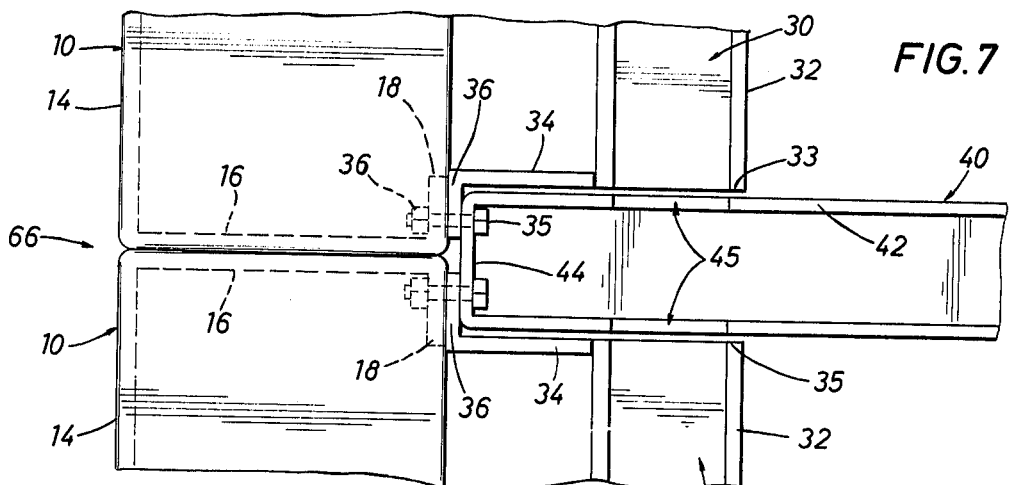
FIG. 7 is a partial detailed view of the juncture of adjacent header troughs and a cross-trough of the present invention.
Figure 6:
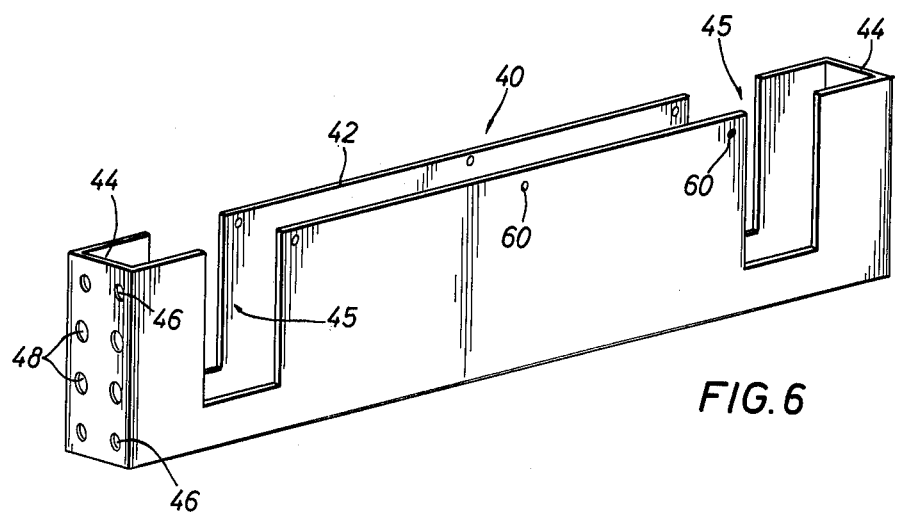
FIG. 6 is a detailed perspective view of the cross-trough of the present invention.

Referring now to FIGS. 5, 6 and 7, a partial view of a conventional installation is shown in which equipment panels 10 are arranged in side-by-side groups called switchboards 66 and with two such switchboard groups 66 arranged in a back-to-back parallel configuration. A cross-trough 40 is shown interconnected at both ends 44 to one of the parallel switchboards 66 and is utilized to support panel interconnecting cables and conductors.

Cross-trough 40 comprises a U-shaped channel member 42 having closed end walls 44. Each end wall 44 carries two pair of spaced-apart bolt-holes 46, each pair located adjacent the opposite vertical extremities of end wall 44. Additionally, two pair of bolt-head apertures 48 are carried in the central portion of each end wall 44 between the spaced-apart bolt-holes 46. The location and spacing of bolt-holes 46 and bolt-head apertures 48 are predetermined as will be hereinafter further explained.

Referring now to FIGS. 5, 6 and 7, it may be seen that the length of cross-channel member 40 will be predetermined by the spacing between parallel switchboards 66. Channel member 40 has a width predetermined by the spacing between adjacent header trough ends 33 associated with abutting equipment racks 10. When channel member 40 is positioned between parallel switchboards 66, the bolt-head apertures 58 are large enough to fit over the pair of nut and bolt fasteners 35, 36 used to fasten the header trough 30 to the panel 10 to allow cross-trough end 44 to abut directly against the flanges 36 of header trough 30. Bolt-holes 46 then register with holes 38 in flange 36 for fastening the cross-trough by conventional nut and bolt arrangement 35, 36 to abutting equipment panels 10 in the parallel switchboards 66.

In addition, rectangular openings 45 are provided in the side walls of cross-trough 40 for registering with the ends 33 of header trough 30 for permitting cables or conductors 31 (see FIG. 2) in header trough 30 to be transferred to a cross-trough 40 and vice-versa.

When mounted as above-described, the header troughs 30 interconnect to each panel 10 within a juxtaposed group of panels and the cross-troughs 40 transversely interconnect parallel groups of panels 10 for cooperating to provide a cable trough system for receiving the system interconnecting cables 31.

In FIG. 2, a conventional terminal block 52 having paired connections 'A' and 'B' is mounted on the outside of header trough 30 along the outside surface of channel member 32. This allows each panel 10 to be internally wired prior to emplacement within the grouping. Thus, an intrapanel conductor 28 may be interconnected at one end to electrical equipment 12, run through the internal channel 25 formed by rods 24 and interconnected at the remaining end to terminals 'A' of terminal block 52. As shown, the conductor 31 is interconnected to the corresponding terminal 'B' on the terminal block 52. In this manner all of the equipment 12 contained within a particular panel 10 may be interconnected to the conductors carried by the trough system associated with the installation without pulling conductors 31 into panels 10.

A novel feature of the present invention is the capability of removing a single panel 10 from one of the switchboard groups 66. This is accomplished by disconnecting the conductors interconnected to the 'B' terminals of the terminal block 52, removing only the bolts 34 interconnecting cross-trough members 40 to the particular panel 10 which is to be removed. Thus, by removing four bolts, namely, the two bolts passing through bolt-holes 46 connecting each of the cross-trough members 40 to the panel 10 being removed, the panel is free of cross-connections. The conductors 31 carried within the header trough 30 associated with the panel to be removed are then raised out of header trough 30, and the panel 10 is tilted forward and moved out of the switchboard 66. Thus, it may be seen that even after a panel 10 is removed, support for the cross-troughs 40 is provided by the remaining connection of cross-troughs 40 to the panels 13 on either side of the removed panel for supporting the conductors 31 until a new panel 10 is installed. Installation of the new panel 10 will be carried out in the reverse procedure for removal of the panel 10 as above-described.

Figures 8, 9:
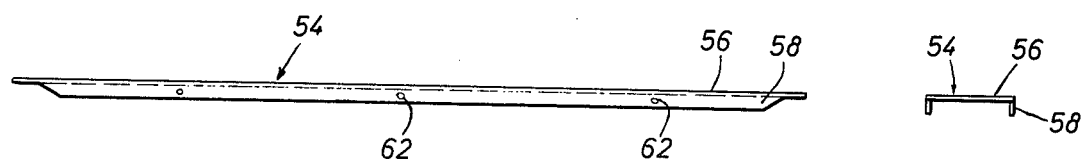
FIG. 8 is a side view of a cross-trough cover of the present invention.
FIG. 9 is an end view of the cross-trough cover depicted in FIG. 8.

In some installations such as those in dust filled environments, it may be desirable to provide a cover for the cross-trough system 40. In FIGS. 8 and 9, such a cover 54 is depicted and is formed from a U-shaped channel member having a web 56 and depending flanges 58. The web 56 and the space between flanges 58 are for allowing the cover to be positioned over the cross-trough sides 42. Additionally, cross-trough sides 42 and cover edges 58 carry a plurality of apertures 60 and 62, respectively, which register when the cover 54 is in place, and which permits a conventional securing means such as screws (not shown) to be used for securing cover 54 to cross-trough 40.

Numerous variations and modifications may be made in the structure herein described without departing from the present invention. Accordingly, it should be clearly understood that the forms of the invention herein described and shown in the figures of the accompanying drawings are illustrative only and are not intended to limit the scope of the invention.

What is claimed is:

1. In an electrical equipment panel having a generally U-shaped horizontal cross-section defining a vertical front panel member, a pair of vertical end members each of which extend normally from one edge of said front panel, and a pair of spaced vertical rear members, each extending normally from one edge of one of said end members and spaced in parallel relation to said front panel for defining a pair of inwardly facing spaced channels at opposite ends of the panel, the combination therewith of
cable retention means extending from the rear surface of the vertical front panel adjacent to each of said end members and in a spaced parallel relation thereto, the extending end of said cable retention means terminating short of the inner surface of said rear vertical members for defining a cable-insertion space therebetween.

2. The improvement described in claim 1, wherein said cable retention means comprises a plurality of horizontally extending vertically-spaced rigid members.

3. The improvement described in claim 2, wherein said rigid members comprise a plurality of rods.

4. The improvement described in claim 1, further including header trough means attached across said pair of vertical rear members adjacent the upper extremities thereof for receiving and supporting electrical cables and conductors.

5. The improvement described in claim 4, wherein said header trough means comprises,
an open-ended channel member having a generally U-shaped vertical cross-section and a length less than the dimension between said spaced end members of the equipment panel,
a pair of brackets fixed to each end of said channel member and laterally projecting therefrom and terminating in outwardly facing mounting flanges adapted for attachment to the pair of spaced vertical rear members of the equipment panel for mounting said header trough in a parallel spaced relation thereto, and
mounting means cooperating with said mounting flanges of said brackets and said pair of spaced vertical rear members for attaching said header trough to the equipment panel.

6. The improvement described in claim 5, wherein said outwardly facing mounting flanges are generally L-shaped and carry a plurality of spaced apertures, and wherein said mounting means comprises a plurality of mounting bolts for attaching said header trough to the equipment panel.

7. The improvement described in claim 4, further including an electrical terminal block having a plurality of paired electrically connected terminals mounted on the outer surface of said header trough means.

8. The improvement described in claim 6, wherein the equipment panel comprises a first equipment panel and said header trough means comprises a first header trough means, and further includes a second equipment panel located adjacent said first equipment panel in an abutting relationship, a second header trough means attached to said second equipment panel in spaced horizontal alignment with said first header trough means, the adjacent spaced ends of said first and second header trough means defining a first opening having a predetermined dimension, a pair of equipment panels oriented in a spaced parallel relationship with said first and second equipment panels and in an abutting relationship with each other.

a pair of header trough means attached to said pair of equipment panels in spaced horizontal alignment and facing said first and second header trough means and in substantial horizontal spaced alignment therewith, the spaced adjacent ends of said pair of header trough means defining a second opening having a predetermined dimension, and cross-trough means extending between said first and second equipment panels and said pair of equipment panels for cooperating with said first and second header trough means and said pair of header trough means for supporting external conductors connecting said first and second equipment panels and said pair of equipment panels, the ends of said cross-trough means extending into said first and second openings and into overlapping abutting relationship with said adjacent ones of said mounting flanges of said first and second header troughs and said pair of header troughs for removable attachment to said first and second equipment panels and said pair of equipment panels for permitting removal of one of said equipment panels and attached header trough while said cross-trough means remains attached to the remaining equipment panels.

9. The improvement described in claim 8, wherein said cross-trough means comprises, a channel member having a generally U-shaped vertical cross-section and a width dimension substantially equal to said first and second openings between adjacent header trough means, a pair of end members disposed on opposite ends of said channel member for forming a rectangular box member, each end member having a plurality of spaced apertures disposed therein for registering with said spaced apertures of both said adjacent first and second header trough brackets and both said adjacent pair of header trough brackets, said channel member having openings disposed in both sides of said channel member adjacent each end for registering with said respective adjacent open ends of said first and second header trough channels and said pair of header trough channels when said cross-trough end members are disposed in said first and second openings in abutting relationship with said adjacent L-shaped bracket flanges of both said first and second header trough brackets and both said pair of header trough brackets, and fastening means cooperating with said apertures in said cross-trough channel end members and said apertures in said L-shaped header trough mounting brackets for removably attaching one end of said cross-trough to the adjacent vertical rear members of said first and second equipment panels and the other end thereof to the adjacent vertical rear members of said pair of equipment panels.

10. The improvement described in claim 9, wherein said L-shaped flange of said header trough brackets has a plurality of vertically spaced apertures for receiving and cooperating with at least one of said bolts to removably attach said header trough to the rear of said equipment panel, and wherein each end member of said cross-trough has a plurality of vertically spaced apertures for registering with a plurality of said apertures provided by said two adjacent L-shaped flanges on abutting equipment panels, said apertures that register with said apertures of said L-shaped flanges containing said bolts being sized to accommodate the head of said bolt, and wherein said fastening means are bolts adapted for insertion through said remaining apertures of said cross-trough end members and said apertures of said header trough mounting flanges for removably attaching said cross-trough between said adjacent header troughs and to the rear of the equipment panels.

11. The combination described in claim 8 and further including a cover member releasably attachable to said cross-trough means.

12. A cable trough system for supporting electrical cables and conductors interconnected between spaced, parallel groups of abutting electrical equipment panels, comprising a first pair of header trough means, each attached to one of a first pair of abutting equipment panels in one of said parallel groups of panels and in spaced horizontal alignment with each other and facing the other parallel group of panels, the adjacent spaced ends of said first pair of header trough means defining a first opening having a predetermined dimension, a second pair of header trough means, each attached to one of a second pair of abutting equipment panels in said other parallel group of panels and in spaced horizontal alignment with each other and facing said first pair of header trough means and in substantial horizontal alignment therewith, the adjacent spaced ends of said second pair of header trough means defining a second opening having a predetermined dimension, and cross-trough means extending between said first and second pairs of abutting equipment panels for cooperating with said first and second pairs of header trough means for supporting electrical cables and conductors connecting electrical equipment mounted in said abutting electrical equipment panels, and permitting removal of one of said abutting equipment panels with attached header trough means while said cross-trough means remains attached to the remaining equipment panels.

13. The improvement described in claim 12, wherein each of said header trough means comprises, an open-ended channel member having a generally U-shaped vertical cross-section and a length less than the dimension between opposing abutting surfaces of the equipment panel, a pair of brackets fixed to each end of said channel member and laterally projecting therefrom and terminating in outwardly facing mounting flanges adapted for attachment to the equipment panel for mounting said header trough in a parallel spaced relation thereto, and mounting means cooperating with said mounting flanges of said brackets and the equipment panel for attaching said header trough to the equipment panel.

14. The improvement described in claim 13, wherein said outwardly facing mounting flanges are generally L-shaped and carry a plurality of spaced apertures, and wherein said mounting means comprises a plurality of mounting bolts for attaching said header trough to the equipment panel.

15. The improvement described in claim 12, further including an electrical terminal block having a plurality of paired electrically connected terminals mounted on the outer surface of said header trough means.

16. The improvement described in claim 14, wherein said cross-trough means comprises a channel member having a generally U-shaped vertical cross-section and a width dimension substantially equal to said first and second openings between adjacent header trough means, a pair of end members disposed on opposite ends of said channel member for forming a rectangular box member, each end member having a plurality of spaced apertures disposed therein for registering with said spaced apertures of adjacent brackets of said first pair of header troughs and adjacent brackets of said second pair of header troughs, said channel member having openings disposed in both sides of said channel member adjacent each end for registering with said respective adjacent open ends of each channel of said first and second pairs of said header trough channels when said cross-trough end members are disposed in said first and second openings in abutting relationship with said adjacent L-shaped bracket flanges of both said first and second pairs of said header trough brackets, and fastening means cooperating with said apertures in said cross-trough channel end members and said apertures in said L-shaped header trough mounting brackets for removably attaching one end of said cross-trough to said first pair of abutting equipment panels and the other end thereof to said second pair of abutting equipment panels.

17. The improvement described in claim 16, wherein said L-shaped flange of said header trough brackets has a plurality of vertically spaced apertures for receiving and cooperating with at least one of said bolts to removably attach said header trough to the rear of said equipment panel, and wherein each end member of said cross-trough has a plurality of vertically spaced apertures for registering with a plurality of said apertures provided by said two adjacent L-shaped flanges on abutting equipment panels, said apertures that register with said apertures of said L-shaped flanges containing said bolts being sized to accommodate the head of said bolt, and wherein said fastening means are bolts adapted for insertion through said remaining apertures of said cross-trough end members and said apertures of said header trough mounting flanges for removably attaching said cross-trough between said adjacent header troughs and to the rear of L-shaped flanges containing said bolts being sized to accommodate the head of said bolt, and wherein said fastening means are bolts adapted for insertion through said remaining apertures of said cross-trough end members and said apertures of said header trough mounting flanges for removably attaching said cross-trough between said adjacent header troughs and to the rear of the equipment panels.

18. The combination described in claim 17 and further including a cover member releasably attachable to said cross-trough means.

* * * * *